Patented Aug. 18, 1953

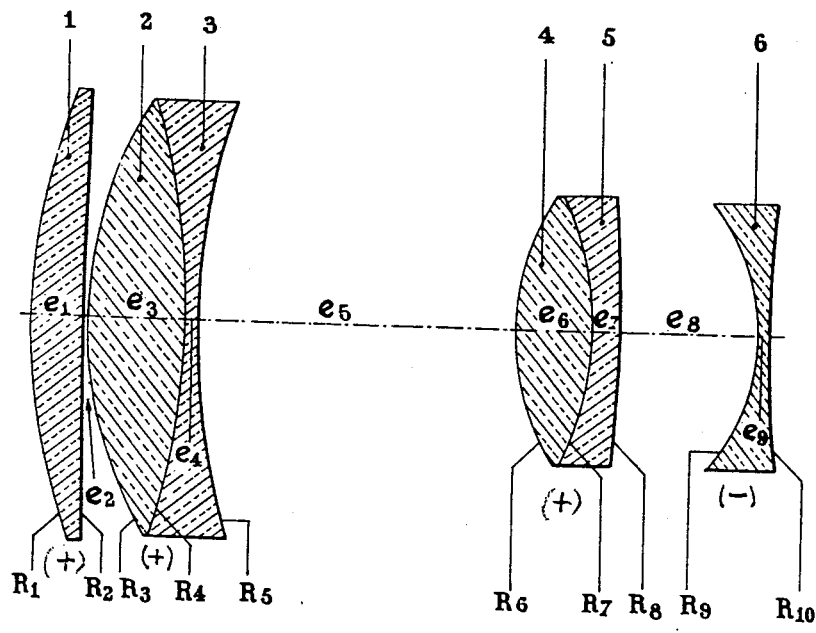

2,649,021

UNITED STATES PATENT OFFICE 2,649,021

LARGE APERTURE PHOTOGRAPHIC OBJECTIVE

Pierre Angénieux, Paris, France

Application July 1, 1950, Serial No. 171,683
In France December 7, 1949

2 Claims. (Cl. 88—57)

This invention relates to a large aperture objective ensuring a good definition in a field of the order of 25°.

It is known that in objectives for which a relative aperture above 1:1.5 is required, it is very difficult to obtain a satisfactory reduction of the defects caused by astigmatism, coma and distortion in a somewhat large field. As a rule, high-index glasses having a low dispersive power are used for convergent lenses, in an attempt to reduce these aberrations.

Regarding more especially projection objectives having a relatively great focal length of for instance 100 mm., the use of high-index and low dispersive power glasses may offer serious drawbacks. In fact, these glasses, in addition to their high cost price, are not so transparent as crown or borosilicate crown glasses. Now as the lens dimension is a function of the focal length and objective aperture, these drawbacks will rapidly increase with said focal length and with said aperture.

The use of crown or borosilicate crown glasses for convergent lenses is obviously advantageous but, on the other hand, it is difficult, with these glasses, to obtain good quality images in a somewhat large field.

In order to overcome this drawback it has already been proposed (Handbuch der wissenschaftlichen und angewandten Photographie by Alfred Hay and M. v. Rohr, Edition Julius Springer, Vienna, 1932, Band I—Das photographische Objektiv, page 326, Table 1 and Figure 297, page 329, and also U. S. Patent 2,076,190) to employ, in combination with an objective of the Petzval type, a negative lens positioned very close to the focal plane of said objective and having for its scope to flatten the field. Thus, the results have been improved, but the image obtained through these objectives retains a considerable distortion and the maximum aperture obtained is only 1:1.6.

This invention has for its object to provide a novel objective using also a negative component placed close to its focal plane, but wherein the optical device positioned in front of this negative component is not an objective of the Petzval type.

According to this invention, the device comprises two sets of lenses disposed at a relatively great distance from each other, in relation to the focal length of the assembly.

The first set, as shown in the single figure of the annexed drawing, comprises two components arranged in the so-called Gauss objective form, namely: in front, a convergent lens 1, preferably of meniscus shape, with its convex surface positioned in front, and, very close to this first lens, a meniscus-shaped doublet consisting of a pair of cemented lenses 2, 3 with the concave surface of the meniscus directed to the rear.

The second set consists of a convergent doublet comprising a pair of cemented lenses 4, 5. The negative lens 6 referred to hereinabove is positioned very close to the focal plane of the device thus described. It is an integral part of the objective because without this component the optical device placed in front of it would be useless due notably to the strong field curvature, distortion and importance of the coma, which affect the images given by this device if taken separately. It would be possible to reduce these defects, if one wished to use the device without the negative lens 6, but as inverse effects are produced by this lens it is necessary that these effects neutralize each other and therefore the assembly is a true combination the various elements of which cannot be used separately.

It should be noted, however, that when focusing the objective, the whole of the objective is not moved, but the portion 1, 2, 3, 4, 5 only thereof should be moved, the negative lens 6 remaining fixed in relation to the position of the image. This is indispensable because the correcting effects of the negative lens vary greatly when it is away from the image plane, whilst the defects caused by the front portion device vary between small limits, when the same is moved for focusing.

The following table shows the characteristics of an objective constructed in accordance with the invention. In this table, and in the accompanying drawing, the lenses are designated by the reference numerals 1 to 6 in the front-to-rear direction. The radiuses of curvature are indicated by the signs $R_1$, $R_2$, ... $R_{10}$ and the thicknesses of the lenses with the space intervals between the lenses by the signs $e_1$, $e_2$ ... $e_9$. The table indicates also the indices of refraction for the D-line and the values of the dispersing power ($\nu$) of the lenses used. All the data given in this table relate to an objective having a focal length of 100 units and an aperture of 1:1.15.

| Lens ref. No. | Glasses | | Radiuses | Thicknesses |
|---|---|---|---|---|
| | $n_D$ | $\nu$ | | |
| 1 | 1.51802 | 64.40 | $R_1 = +\ 121.11$ | $e_1 = 10.38$ |
| | | | $R_2 = +1,600.43$ | $e_2 = .86$ |
| 2 | 1.51802 | 64.40 | $R_3 = +\ 81.32$ | $e_3 = 19.90$ |
| 3 | 1.62871 | 35.30 | $R_4 = -\ 138.42$ | $e_4 = 2.08$ |
| | | | $R_5 = +\ 138.42$ | $e_5 = 62.15$ |
| 4 | 1.51802 | 64.40 | $R_6 = +\ 49.31$ | $e_6 = 14.71$ |
| 5 | 1.62871 | 35.30 | $R_7 = -\ 60.56$ | $e_7 = 5.54$ |
| | | | $R_8 = -\ 332.20$ | $e_8 = 28.03$ |
| 6 | 1.65027 | 34.60 | $R_9 = -\ 40.66$ | $e_9 = 1.73$ |
| | | | $R_{10} = +\ 288.08$ | |

The characteristics of this objective are given only by way of example and it is understood that they should not be considered as limiting the scope of the invention. The calculations and tests made by the applicant in order clearly to define the invention have brought out the following points:

The front set comprising the three lenses 1, 2 and 3 is formed as a Gauss objective in order to minimize the residual spherical aberration and thus attain a large aperture. With this arrangement, this set will also act favorably with respect to the correction of the other aberrations and more especially the coma and the distortion. In this set it is advantageous to have the lens 1 of miniscus shape but it would not be much prejudicial to use a slightly biconvex lens instead. However, the doublet formed by the lenses 2, 3 must have a meniscus shape with the concave surface at the rear.

The characteristics of the other components are derived from the composition of this first set in the form of a Gauss objective. An experienced computer will be able to obtain satisfactory results in any case from this initial device by utilizing a second set consisting of a doublet 4, 5 positioned at a relatively long distance from the first set and farther and very close to the focal plane, a negative lens 6. As a matter of fact, the computations have shown that the distance between the first and second sets should be longer than 40% of the focal length of the objective assembly and shorter than the said focal length and that the negative lens should always have a substantially plano-concave form with the flattest surface always directed to the rear close to the focal plane, while the absolute value of the focal length of this negative lens should be lower than the corresponding value of the entire objective assembly and greater than 30 percent of the focal length of the said objective. On the other hand, while the objective shown and described is made of six component parts only, it will be readily apparent that each lens may be decomposed in two or more lenses cemented together, without interfering with the spirit and scope of the invention.

On the other hand, it is advantageous to utilize glass having an index of refraction lower than 1.54 for the line D, for the convergent lenses, and glass having an index higher than 1.60 for the line D, for the negative lenses.

What I claim as new is:

1. An objective having a relative aperture larger than 1/1.5, corrected for spherical aberration, astigmatism, distortion and coma comprising firstly a component consisting of a convergent lens and at the rear thereof and very close thereto a meniscus-shaped doublet with its concave surface directed to the rear, comprising a convergent lens cemented to the front of a divergent lens, said component being arranged according to the so-called Gauss objective type; secondly a convergent doublet comprising a convergent lens cemented to the front of a divergent lens and positioned at a distance from the first doublet, smaller than the focal length of the objective assembly and greater than 40% of the said focal length, the index of refraction of the convergent lens of each doublet being smaller than the index of refraction of the divergent lens of the corresponding doublet, whilst the dispersing power ($\nu$) of said convergent lens is greater than the $\nu$ value of said divergent lens; and thirdly, very close to the focal plane of the objective and in front of it, a divergent lens of relatively strong power having a focal length the absolute value of which is higher than 30 percent of the objective focal length and shorter than the said focal length, the two opposite faces of said divergent lens being of different curvatures with the face of smaller curvature positioned at the rear.

2. An objective having the following numerical data:

Focal length F=100   Relative aperture=1/1.15

| Lens Ref. No. | Glasses | | Radii of the lens surfaces | Thicknesses and axial separations |
|---|---|---|---|---|
| | $n_D$ | $\nu$ | | |
| 1 | 1.51802 | 64.40 | $R_1 = +\ 121.11$ | $e_1 = 10.38$ |
| | | | $R_2 = +1600.43$ | $e_2 = .86$ |
| 2 | 1.51802 | 64.40 | $R_3 = +\ 81.32$ | $e_3 = 19.90$ |
| 3 | 1.62871 | 35.30 | $R_4 = -\ 138.42$ | $e_4 = 2.08$ |
| | | | $R_5 = +\ 138.42$ | $e_5 = 63.15$ |
| 4 | 1.51802 | 64.40 | $R_6 = +\ 49.31$ | $e_6 = 14.71$ |
| 5 | 1.62871 | 35.30 | $R_7 = -\ 60.56$ | $e_7 = 5.54$ |
| | | | $R_8 = -\ 332.20$ | $e_8 = 28.03$ |
| 6 | 1.65027 | 34.60 | $R_9 = -\ 40.66$ | $e_9 = 1.73$ |
| | | | $R_{10} = +\ 288.08$ | |

$e_1$, $e_3$, $e_4$, $e_6$, $e_7$, and $e_9$ denoting the axial thickness of lens elements, and $e_2$, $e_5$, and $e_8$ denoting the axial separation of lens elements.

PIERRE ANGÉNIEUX.

References Cited in the file of this patent

UNITED STATES PATENTS

| Number | Name | Date |
|---|---|---|
| 2,076,190 | Wood | Apr. 6, 1937 |
| 2,187,780 | Gehrke et al. | Jan. 23, 1940 |
| 2,445,594 | Bennett | July 20, 1948 |

FOREIGN PATENTS

| Number | Country | Date |
|---|---|---|
| 127,058 | Great Britain | May 29, 1919 |
| 857,887 | France | Apr. 29, 1940 |